United States Patent [19]

Meyer

[11] 4,265,580

[45] May 5, 1981

[54] SYSTEM FOR THROTTLING AND COMPENSATION FOR VARIABLE FEEDSTOCK PROPERTIES

[75] Inventor: John W. Meyer, Palo Alto, Calif.

[73] Assignee: Lockheed Missiles & Space Company, Inc., Sunnyvale, Calif.

[21] Appl. No.: 32,651

[22] Filed: Apr. 23, 1979

[51] Int. Cl.³ .............................................. F23D 11/06
[52] U.S. Cl. .................................... 414/217; 239/224
[58] Field of Search ....................... 222/410; 414/217; 239/223, 224; 406/71

[56] References Cited

U.S. PATENT DOCUMENTS

| | | | |
|---|---|---|---|
| 3,103,311 | 9/1963 | Kempf | 239/224 X |
| 3,182,825 | 5/1965 | Zellerhoff | 414/217 |
| 4,049,133 | 9/1977 | Staudinger | 214/17 |

Primary Examiner—Stanley H. Tollberg
Attorney, Agent, or Firm—H. Donald Volk

[57] ABSTRACT

Apparatus is shown for adjusting the feed rate of pulverized feed material into a pressurized container. The apparatus also has utility for compensating for variations in the permeability of the feed material. A rotor that includes sprues with provision for controlling the pressure distribution along the sprues is located within the pressurized container. The rotor hub is connected to a drive means and a material supply means which extend through the wall of the container. A line for controlling pressure along the sprues by gas injection is connected to a chamber between sections of the sprue for controlling gas pressure at that point. The gas pressure control line is connected to a pressurized gas source and a control system external to the rotor.

6 Claims, 10 Drawing Figures

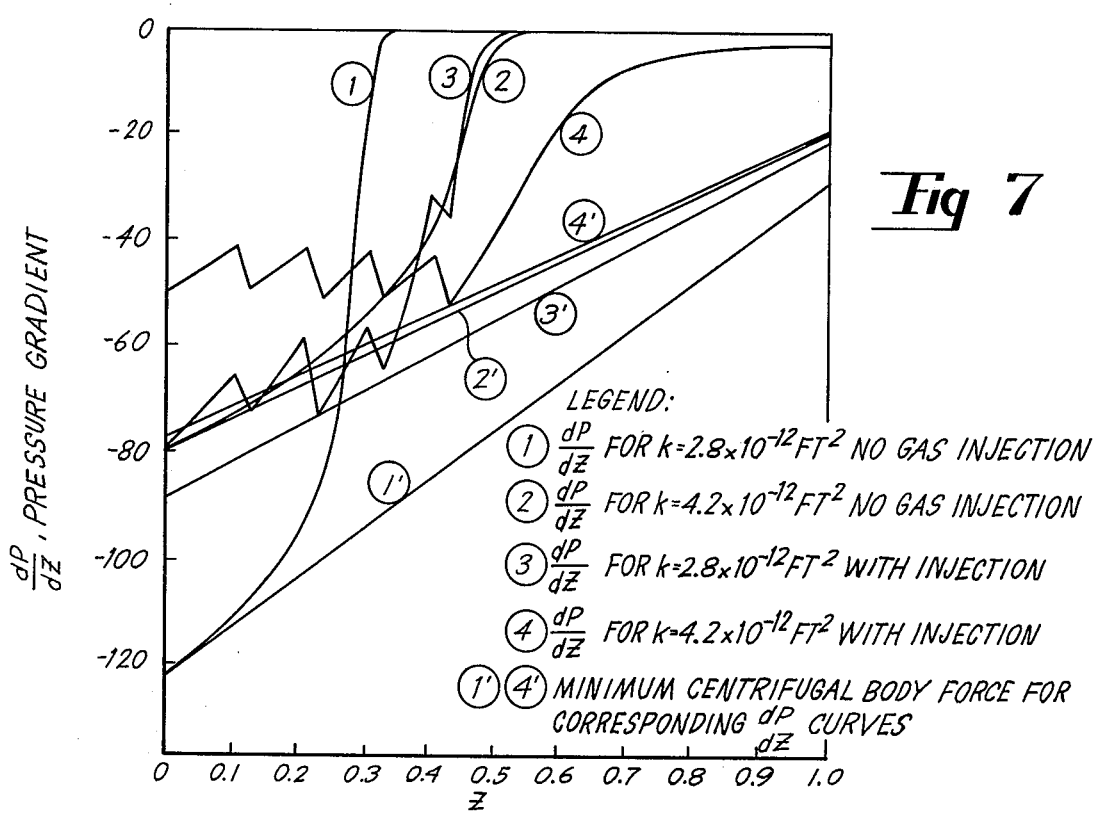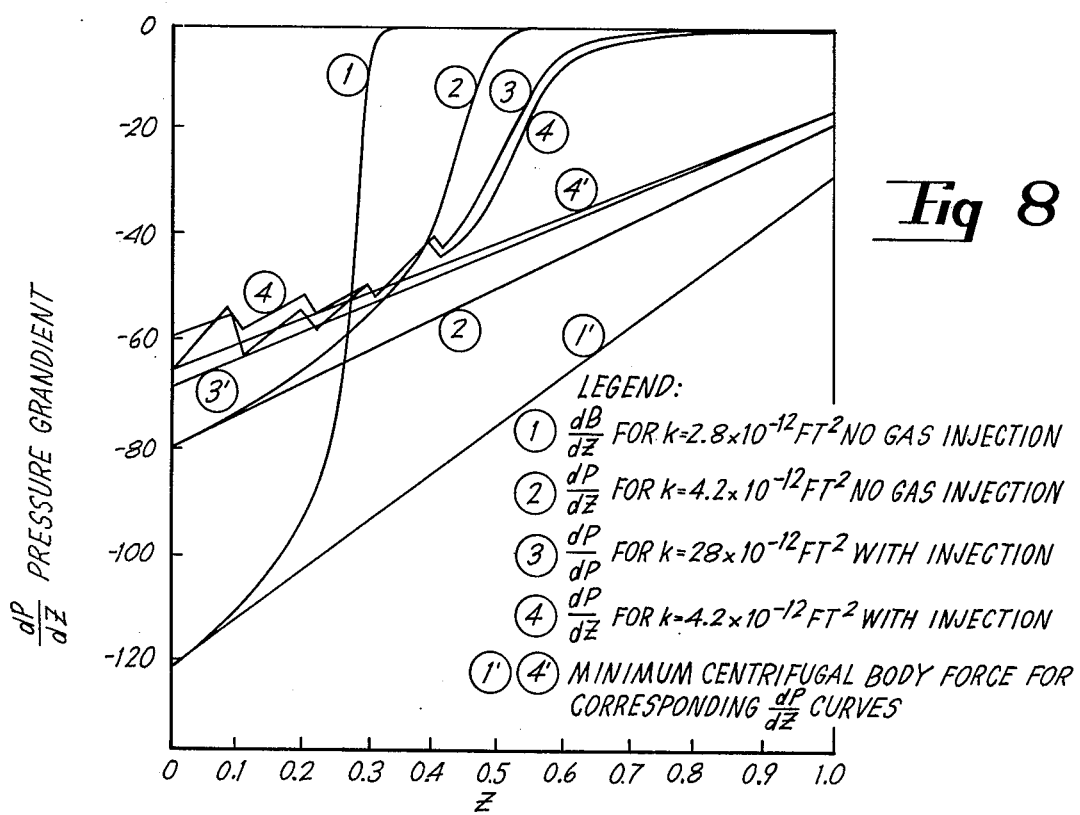

4,265,580

SYSTEM FOR THROTTLING AND COMPENSATION FOR VARIABLE FEEDSTOCK PROPERTIES

BACKGROUND OF THE INVENTION

The Government has rights in this invention pursuant to Contract No. EX76-C-01-1792 awarded by the Department of Energy.

As set forth in co-pending U.S. patent application Ser. No. 32,646 entitled "The Kinetic Extruder—A Dry Pulverized Solid Material Pump", assigned to the same assignee as the present patent application, there are a number of industrial processes which require vessels that operate at elevated pressures; and as part of their operation, it is necessary to feed solid material to them from a lower atmospheric pressure environment. One such process is coal gasification, which utilizes pulverized or powdered coal to generate combustible gases. Such processes require the feeding of pulverized or powdered coal from an atmospheric pressure hopper to an elevated pressure reactor vessel.

The co-pending patent application discloses a method and apparatus for the continuous feeding of pulverized or powdered material to the pressurized container without the need for a carrier fluid, while eliminating blowback of gas through the material or the material feeding means. This result is achieved by the use of a rotor within a pressurized container to which the material is applied. The material is fed from an atmospheric feed hopper through a stationary feed pipe, then through a stationary inner hub and then to a spin-up zone between the stationary inner hub and the rotatable-driven rotor, where the material is forced into the rotor.

Although this kinetic extruder solves many problems existing in the prior art, it cannot compensate for variations in the permeability of the feed material, nor can the feed rate of the material be varied over an extended range.

In a continuous process, it is desirable to vary the rate of feed of the pulverized material to compensate for changes in other parameters within the coal gasification process. Also, the permeability of the porous bed of pulverized coal moving through the sprue will vary as coals from different coal fields are used and, sometimes, for coals within a single field. Since the rate of feed of pulverized coal through the kinetic extruder is dependent upon the permeability, it is desirable to compensate for undesirable variations in the permeability of the coal being fed and to be able to adjust the feed rate to the reactor demand.

BRIEF SUMMARY OF THE INVENTION

The present invention provides a method and apparatus for adjusting and controlling the feed rate of feed material, such as pulverized coal, into a pressurized container and to compensate for variations in feed stock properties at a fixed feed rate. This is achieved by a rotor mounted within the pressurized container that includes staged sprues. The rotor includes a hub which is connected to a drive means. A material supply means extends through the wall of the container to the hub. A line for controlling the gas presssure connects to a plenum in the rotor and from there to points along the sprues for the purpose of controlling the gas pressure at these injection points. The gas pressure control line is connected to a gas supply and control system.

The present invention provides a method to overcome the limitations imposed by the co-pending patent application Ser. No. 32,646 "The Kinetic Extruder—A Dry Pulverized Solid Material Pump", when the requirement to be able to handle various feed stock of different properties and the requirement to be able to vary the feed rate at reasonable power levels are superimposed to the normal pressurization requirment.

When higher feed rates are required or materials having lower permeability are being used, the pressure gradient within the sprues is increased, reducing the net centrifugal forces acting on the material and thus the flow rate. By injecting high pressure gases into the sprue, a favorable pressure gradient can be assured and a more beneficial force balance re-established.

The capability of the device described in co-pending patent application Ser. No. 32,646 entitled "The Kinetic Extruder—A Dry Pulverized Solid Material Pump" is greatly degraded if higher feed rates are required or if a feed stock having lower permeability is used. In these instances, the pressure gradient within the sprues is increased; this reduces or even stops the feed rate if a constant rotor spped is maintained. It requires a very large increase in drive power if the rotor speed is increased to overcome the pressure gradient. The present invention reduces the pressure gradient by injecting a high pressure gas into the sprue and thereby makes it possible to feed lower permeability feed stock or feed at higher rates without substantially increasing the rotor speed and the corresponding driving power.

BRIEF DESCRIPTION OF THE DRAWINGS

FIG. 7 is a plot of sprue pressure gradient distributions for high and low permeability material with a passive gas injection, FIG. 8 is a plot of sprue pressure gradient distributions for high and low permeability material with active gas injection.

DETAILED DESCRIPTION OF THE DRAWINGS

Figure 9:
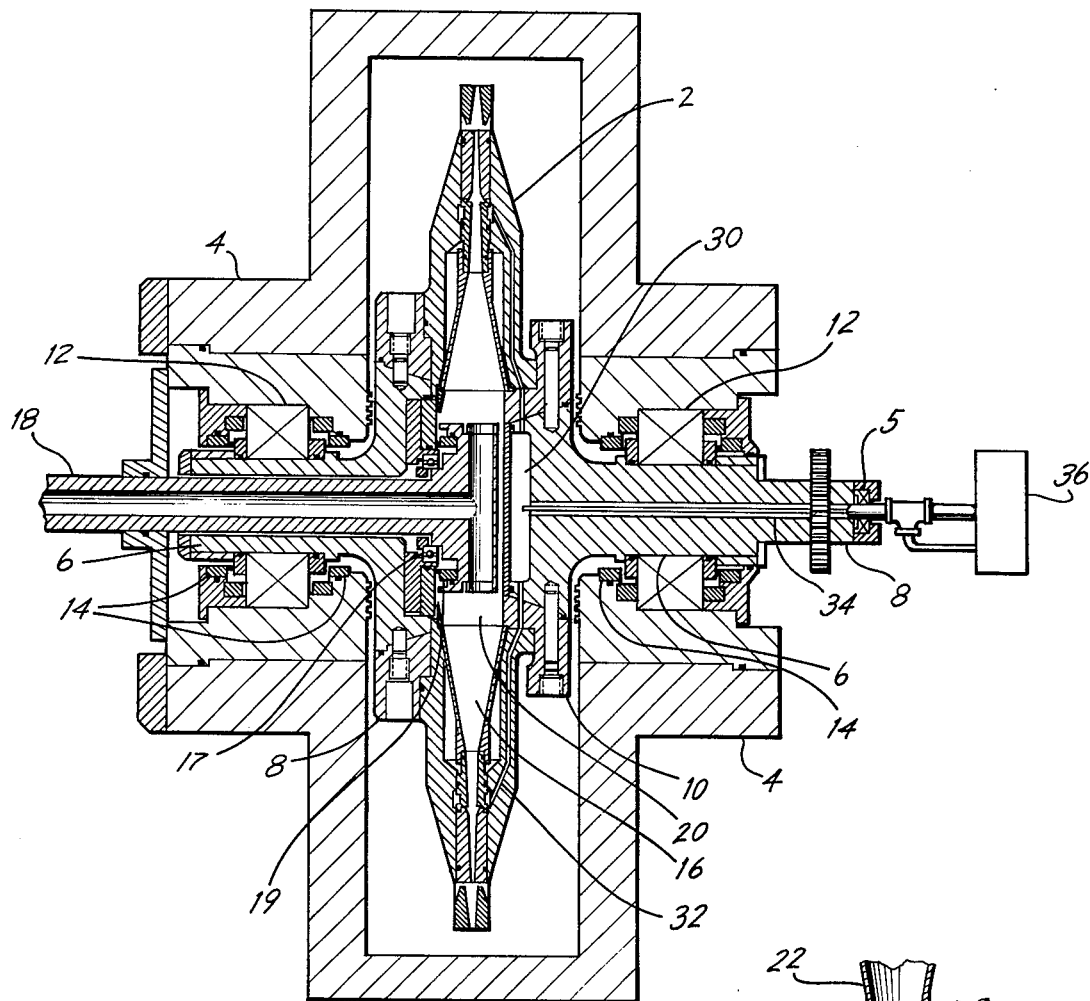
FIG. 9 is a vertical sectional view, with portions shown diagrammatically, of the variable material feeder embodying this invention for feeding pulverized or powdered material to a pressurized container.

Referring now to FIG. 9, there is shown, for purposes of illustration, a rotor 2 that is rotatably mounted in the horizontal axis within the pressure vessel 4. It is understood that, although the rotor is shown and described as being mounted by a horizontal axis, it could be mounted on a vertical or other axis as well. The rotor includes hub portions 6 and mounting clamps 8 and 10. The rotor is rotatably supported by bearings 12. Seals 14 are provided on either side of the bearings to seal the lubricant and to prevent dust from damaging the bearings.

Extending from portion 6 of the rotor 2 is a drive shaft 8. A motor (not shown) is attached to the drive shaft by any well known means to drive the rotor at the desired speed. A stationary T-shaped feed tube 18 is mounted co-axially within the rotor and cooperates with spin-up zone 20 to feed pulverized coal to the plurality of sprues 16.

The feed tube 18 is positioned within the rotor 2 by a bearing 17 and the bearing 17 is protected by the seal 19.

Figure 10:
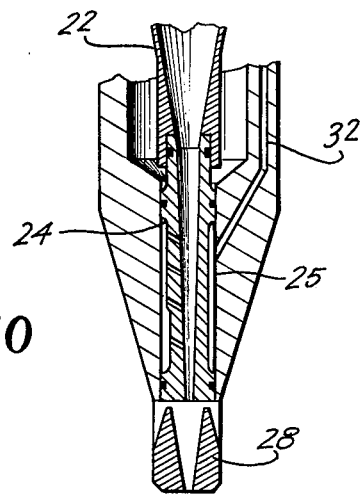
FIG. 10 is an enlarged sectional view of the portion of the rotor of FIG. 1.

Sprues, as shown, are made in two sections. First section 22, viewed sectionally, has a transition from a rectangular cross-sectional shape to a circular cross-sectional shape, provides a large reduction in area. The second section 24 defines an aperture which is circular in cross-sectional area and which has a relatively small area reduction in the radial direction. A plenum 26, as shown in FIG. 10, is located around the second section of the sprue. The coal discharge is from second section 24 into control orifice 28, which are held onto the rotor 2 by two screws (not shown). The function of the control orifice is to meter and stabilize the coal flow through the sprue.

The sprues and control orifices are designed to be easily replaceable.

The rotor hub portion defines a central gas plenum 30. A gas feed line 32 connects the central gas plenum 30 to the sprue plenums 26. The central gas plenum 30 is connected through gas feed line 34 through a rotating seal 5 to a plenum pressure regulator and control system, shown generally as 36.

In operation, coal is fed to the rotor through T-shape feed tube 18 and into the spin-up zone 20. Coal is then fed into first section sprue from spin-up zone. Centrifugal force feeds the coal through the sprue and through the second section sprue and out to the control orifice into pressure vessel 4.

During this operation, the velocity of the porous bed flow of solid material in the sprues should be properly selected to avoid gas leakage from the high pressure region. If the material velocity is too slow, there will be excess gas leakage into the spin-up zone, making it difficult to maintain flow through the T-shape feed tube. If the material velocity is too fast, the gas pressure gradient in the sprue is raised to a high value, choking the sprue. This choking can be overcome by requiring a higher rotor speed, which, in turn, will increase the centrifugal force to keep the material flowing, or by changing the pressure gradient by means of gas injection into the sprue.

The present invention is directed to a means to directly influence the pressure distribution in the sprues.

Computations are presented here illustrating the beneficial effects of gas injection for a particular sprue configuration example. The calculations are made using a computer analysis of the porous bed flow in the sprue channel. The analysis has been validated by comparison with data obtained in tests with the kinetic extruder.

Figure 1:
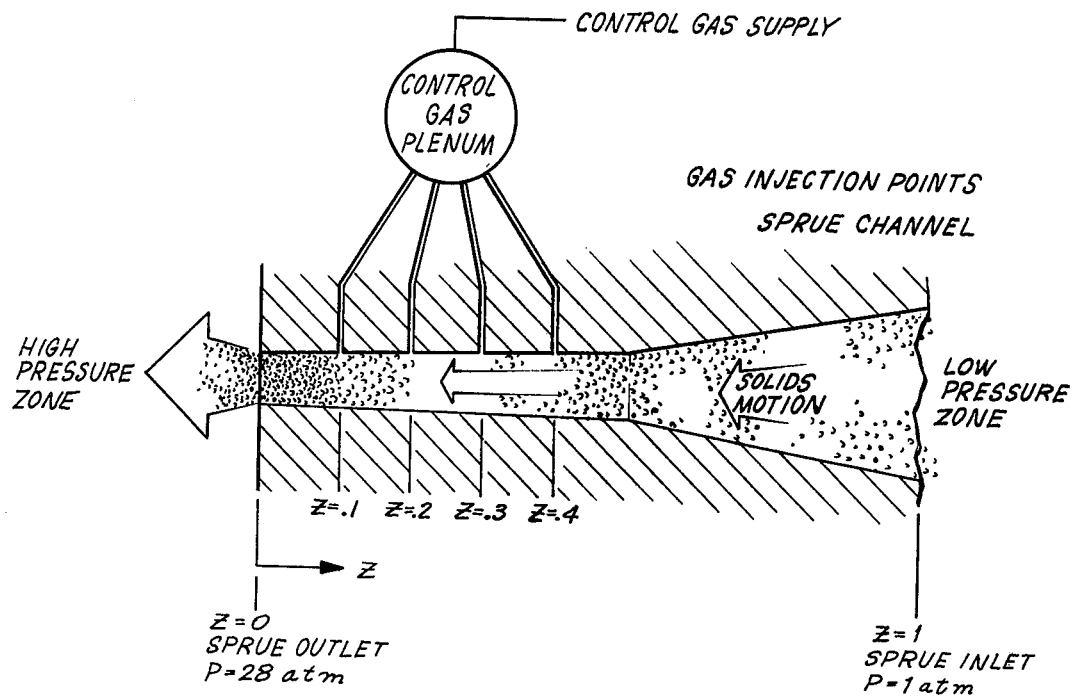
FIG. 1 is a plan view for a gas injection example.
Figure 2:
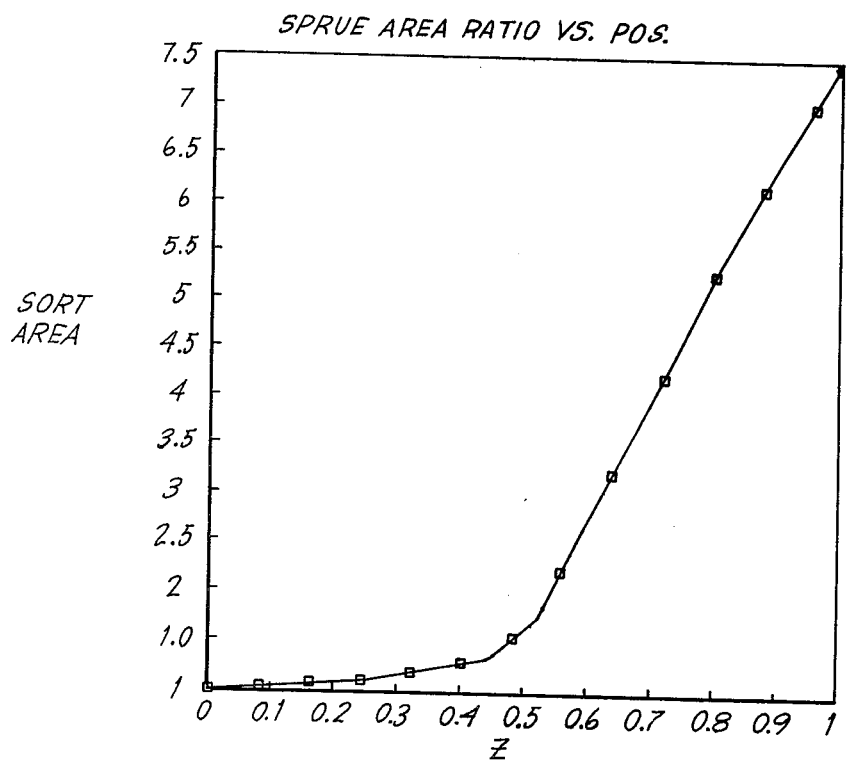
FIG. 2 is a plot of the area of the gas injection example of FIG. 1 versus distance along the gas injection example.

The sprue configuration chosen for the example is shown schematically in FIG. 1. Solid's motion is from right to left. The sprue inlet pressure is 1 atm and the sprue outlet or delivery pressure is 28 atm. The origin ($z=0$) is fixed at the outlet or high pressure end of the sprue. Control gas injection points are assumed to be at normalized positions of $z=0.1$, 0.2, 0.3, and 0.4. The extract area profile of the example sprue is illustrated in FIG. 2. Other data used for the example calculations are as follows:

| | |
|---|---|
| Sprue Length (ft) | = 0.70 |
| Sprue Outlet Area (ft$_2$) | = 5.24 × 10$^{-3}$ |
| Solids Bed Permeability (ft$^2$) | = 2.8 × 10$^{-2}$ or 4.2 × 10$^{-12}$ |
| Solids Bulk Density (lb/ft$^3$) | = 42 |
| Solids Bed Porosity | = 0.533 |
| Gas Viscosity (lb/ft-sec) | = 1.2 × 10$^{-5}$ |

The solids bed data is characteristic of a 70% passing 200 mesh coal grind.

Figure 3:
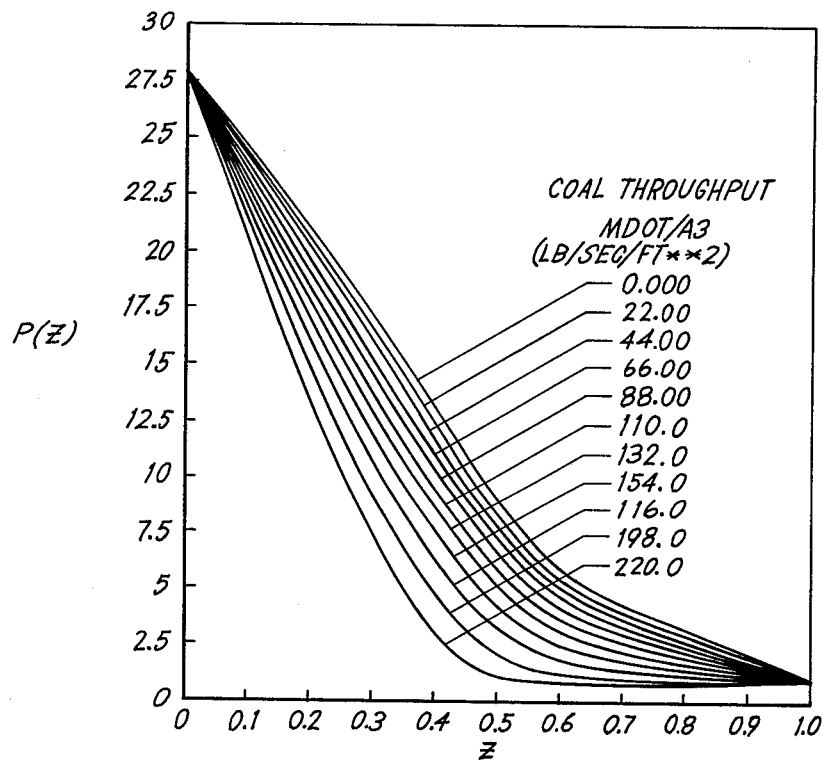
FIGS. 3 and 4 are plots of pressure and pressure gradient distributions without gas injection.
Figure 4:
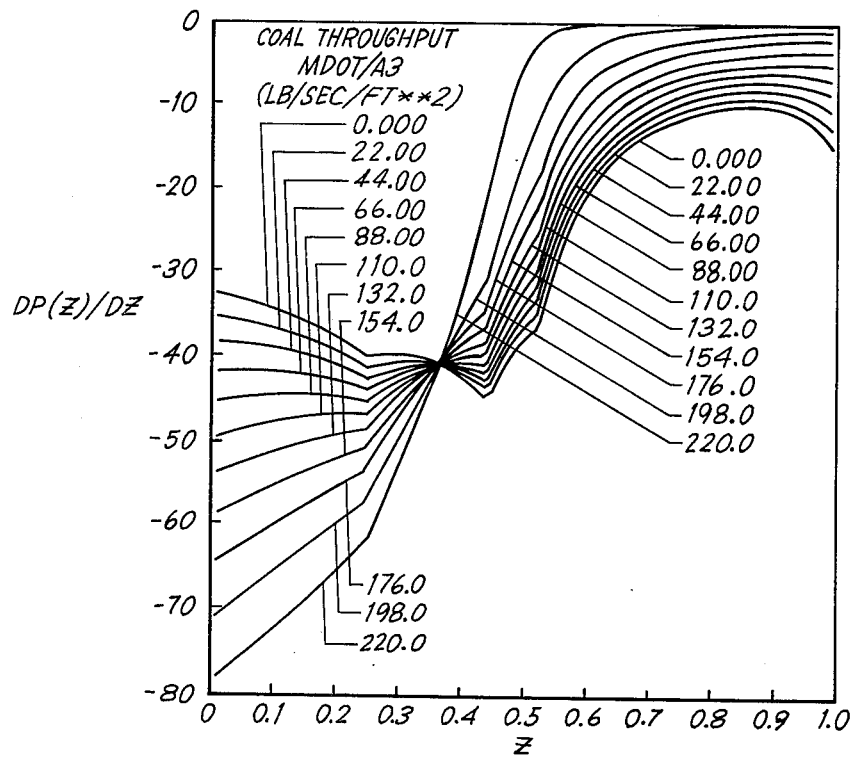

FIGS. 3 and 4 show the results of a calculation for a bed permeability value $k=4.2 \times 10^{-12}$ ft$^2$ and no gas injection. Sprue gas pressure distributions are given in FIG. 3 for a range of solids throughputs corresponding to sprue outlet mass velocities from 0 to 220 lbs/sec/ft$^2$. Pressure gradients, dp/dz, for the same case, are presented in FIG. 4.

The pressure gradient is a key parameter which effects the operation of the kinetic extruder since the rotor speed must be high enough for the centrifugal body force to exceed the opposing pressure gradient in magnitude throughout the sprue for the solids throughput to be maintained, i.e.:

$$|\rho r w^2| > \left|\frac{dp}{dz}\right|$$

where
$\rho$ = bed density
$r$ = distance from rotational axis
$w$ = rotor angular velocity
$\frac{dp}{dz}$ = pressure gradient in compatible units As can be seen in the FIG. 3 and 4 results, the pressure gradient is sensitive to solids throughput. High throughputs tend to concentrate the pressure drop near the outlet end of the sprue, thus increasing (in absolute value) the pressure gradient in that area.

Figure 5:
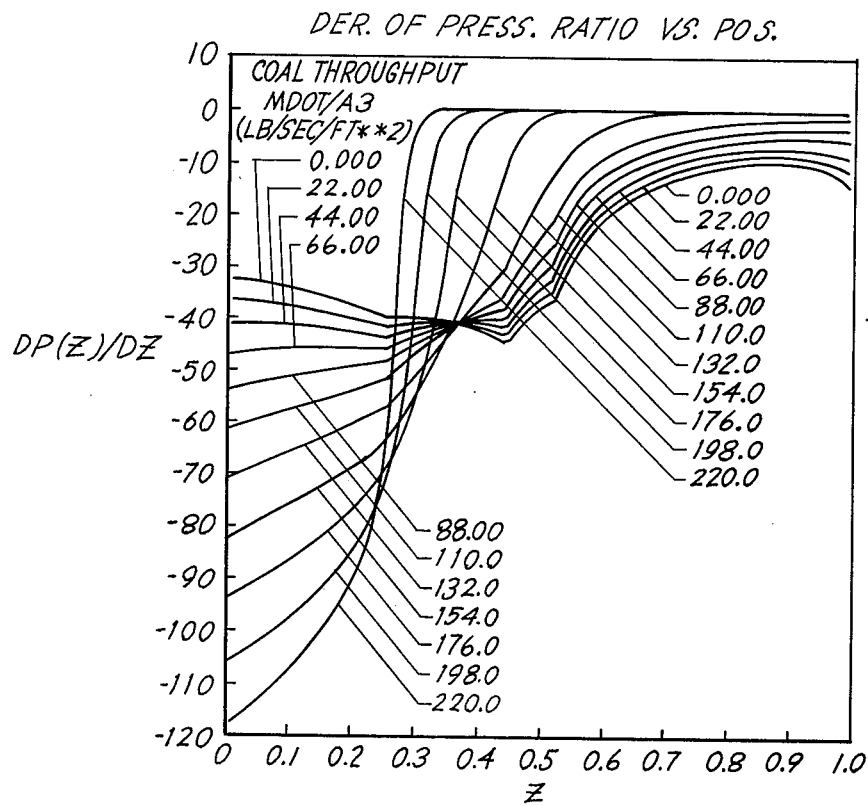
FIG. 5 is a plot of pressure gradient distributions for a different permeability material without gas injection.

The pressure gradient distributions are also sensitive to solids bed properties, particularly permeability, in a similar fashion. FIG. 5 shows calculated results for the same data except that the bed permeability is reduced from $4.2 \times 10^{-12}$ ft$^2$ to $2.8 \times 10^{-12}$ ft$^2$. It may be noted that the range of sprue outlet pressure gradients, for the same range in throughputs, increases from $-32$–$-78$ to $-32$–$-118$ when the permeability is reduced. At the peak throughput, a considerably higher rotor speed, roughly higher by a factor of $\sqrt{118/78}$, would be required to successfully pump the low permeability material. Power requirements increase rapidly with rotor speed, thus high speed represents a significant penalty.

The beneficial effects of gas injection may now be discussed. A large number of gas injection patterns are possible. There may be any number of gas injection points along the sprue. Gas may be injected through either a small orifice or a porous section in the sprue wall. The flow resistance (e.g., orifice area) at the injection points may be different or the same for all injection points. Gas bleeds may all originate from the same plenum in the rotor or there may be two or more plenums maintained at different pressures. The gas injection may be "active", that is, the plenum pressure is adjusted according to changes in throughput or feed stock properties (i.e., permeability), or it may be "passive"— plenum pressure kept constant regardless.

Herein one "active" injection case and one "passive" injection case are analyzed as examples. The gas injection points are shown in FIG. 1 and are the same in both cases. In the "active" case:

| | |
|---|---|
| All injection point orifice areas | $= 2 \times 10^{-6}$ ft$^2$ |
| Control gas plenum pressure | $= 29.6$ atm or $35.7$ atm |
| In the "passive" case: | |
| All injection point orifice areas | $= 5 \times 10^{-6}$ ft$^2$ |
| Control gas plenum pressure | $= 29.6$ atm |

All other data is common to the previous example without gas injection.

Figure 6:
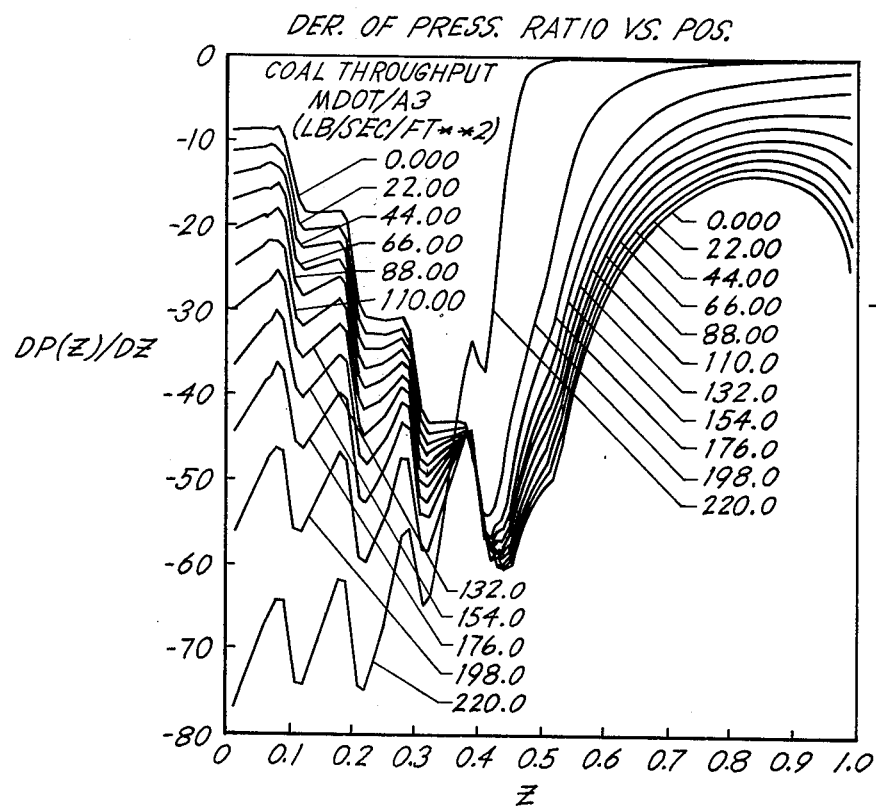
FIg. 6 is a plot of pressure gradient distributions for the same material plotted in FIG. 5, but with the addition of gas injection.

FIG. 6 shows the calculated sprue pressure gradient distributions for the "passive" case gas injection and for $k = 2.8 \times 10^{-12}$ ft$^2$. This is to be compared with the distributions without gas injection shown in FIG. 5. As can be clearly seen, the gas injection has an effect similar to increasing the permeability of the feedstock. Without gas injection, the $|dp/dz|_{max} = 118$ at a throughput of 220 lbs/sec/ft$^2$; with gas injection this was reduced to $|dp/dz|_{max} = 77$. This would reduce the rotor speed requirement for operation.

The benefits of "passive" gas injection are further illustrated in FIG. 7. This shows a comparison of the sprue pressure gradients with and without gas injection for the high and low permeabilities examples. The results show that the dp/dz curves have less sensitivity to changes in permeability when gas injection is used. Minimum rotational body force curves for the cases with gas injection, labeled 3' and 4' in FIG. 7, are much closer together than those with no gas injection, 1' and 2'.

If "active" gas injection is used, even more precise tailoring of the pressure gradient is possible. FIG. 8 shows a comparison of pressure gradients for the high and low permeability cases similar to FIG. 7. Curves 1 and 2 are high and low permeabilities without gas injection as before. Curve 3 is for gas injection with injection orifice areas of $2 \times 10^{-6}$ ft$^2$, a plenum pressure of 29.6 atm, and $k = 4.2 \times 10^{-12}$ ft$^2$. Curve 4 is for $k = 2.8 \times 10^{-12}$ ft$^2$ and a plenum pressure of 35.7 atm, which increases the injection flows. Comparing the disparities between 3 and 4 vs. 1 and 2 shows that the effects of the changes in feedstock permeability have been almost perfectly compensated for by the "active" gas injection.

I claim:

1. Apparatus for the control of the continuous feeding of relatively fine particulate material into a high pressure container, comprising:
   (a) a rotor disposed in a high pressure housing and having a central hub and a plurality of sprues providing a passageway through which the particulate material is passed and which extend radially outward from an inner periphery to the edge of the rotor where the particulate material is discharged,
   (b) each sprue having a wide opening at the inner periphery defining the entrance for the particulate material,
   (c) the walls of the sprues defining a rapidly converging first section as they extend radially outward from the inner periphery to provide a low pressure gradient section for receiving loosely packed particulate material,
   (d) the sprues having a second section extending radially outward beyond and in line with the first section to terminate adjacent an orifice opening at the periphery of the rotor, the walls thereof having a substantial change from the rapid angular convergence of the walls of the first section as the outer edge of the rotor is approached to define a high pressure gradient section of the sprue through which a bed of densely packed particulate material is passed, and
   (e) variable high pressure gas supply means externally of the housing for varying the high pressure gradient in the second section of the sprue to thereby adjust for changes in flow rate or permeability of the particulate material and having an elongated closed gas feed line connected thereto, the discharge end of which extends through the walls of the second section of the sprue.

2. The apparatus for the control of the continuous feeding of relatively fine particulate material into a high pressure container as set forth in claim 1, wherein:
   (a) the variable high pressure means includes a pressure regulator and control system.

3. The apparatus for the control of the continuous feeding of relatively fine particulate material into a high pressure container as set forth in claim 1, wherein:
   (a) the variable high pressure means includes a central gas plenum which has a plurality of feed lines connecting it to the second stage of the sprues.

4. The apparatus for the control of the continuous feeding of relatively fine particulate material into a high pressure container as set forth in claim 1, wherein:
   (a) the variable high pressure means includes a high pressure regulator for supplying gas under high pressure to the second sections of the sprue,
   (b) a central gas plenum mounted within the rotor which is connected to the high pressure gas regulator, and
   (c) feed lines extending from the central gas chamber and connected to passages through the walls of the sprues.

5. The apparatus for the control of the continuous feeding of relatively fine particulate material into a high pressure container as set forth in claims 1 or 4, wherein:
   (a) the variable high pressure means includes a sprue plenum surrounding the second section of each sprue.

6. The apparatus for the control of the continuous feeding of relatively fine particulate material into a high pressure container as set forth in claims 1 or 4, wherein:
   (a) the variable high pressure means includes a sprue plenum extending substantially the length of the second section of the sprue and which has a plurality of radially spaced passages connecting the sprue plenum to the interior of the sprue to provide gas pressure and thereby vary the pressure gradient in the sprue.

* * * * *